United States Patent [19]

Sherikar

[11] Patent Number: 5,014,516
[45] Date of Patent: May 14, 1991

[54] TURBOCHARGER WITH DOWNSTREAM PRESSURE-GAIN COMBUSTOR

[75] Inventor: Sanjay V. Sherikar, Phoenix, Ariz.

[73] Assignee: Tiernay Turbines, Phoenix, Ariz.

[21] Appl. No.: 322,284

[22] Filed: Mar. 13, 1989

[51] Int. Cl.$^5$ ............................................. F02B 37/00
[52] U.S. Cl. ................................................... 60/605.1
[58] Field of Search ........................................ 60/605.1

[56] References Cited

FOREIGN PATENT DOCUMENTS 2338382  1/1976  France .............................. 60/605.1
59021    4/1982  Japan .............................. 60/605.1

*Primary Examiner*—Douglas Hart
*Attorney, Agent, or Firm*—Louise S. Heim

[57] ABSTRACT

A pressure-gain combustor is placed in the exhaust path of the turbine in a turbocharger or turbine engine, thus increasing the pressure drop in the engine. The increased pressure drop in the engine leads to increased turbine power output when the turbocharger or turbine engine is operating under no-load or partial load conditions, thus reducing the problem of turbo lag.

3 Claims, 2 Drawing Sheets

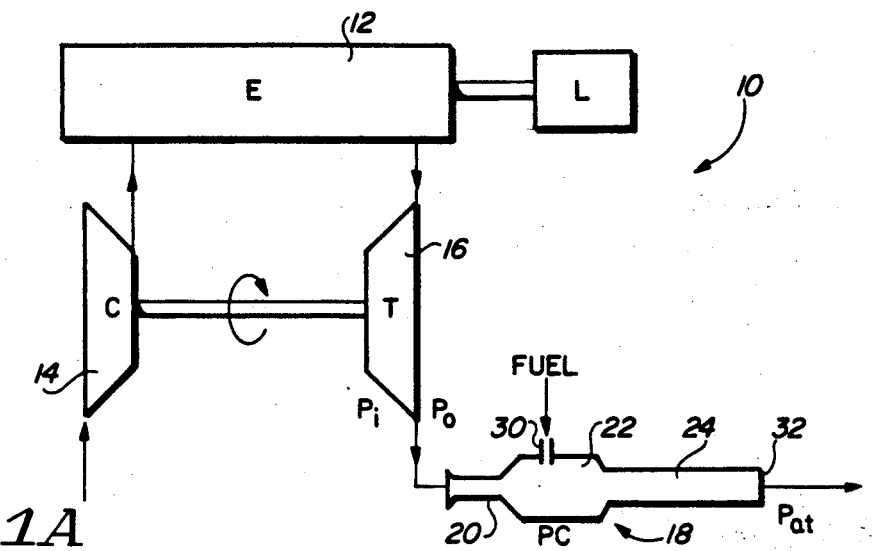
FIG-1A
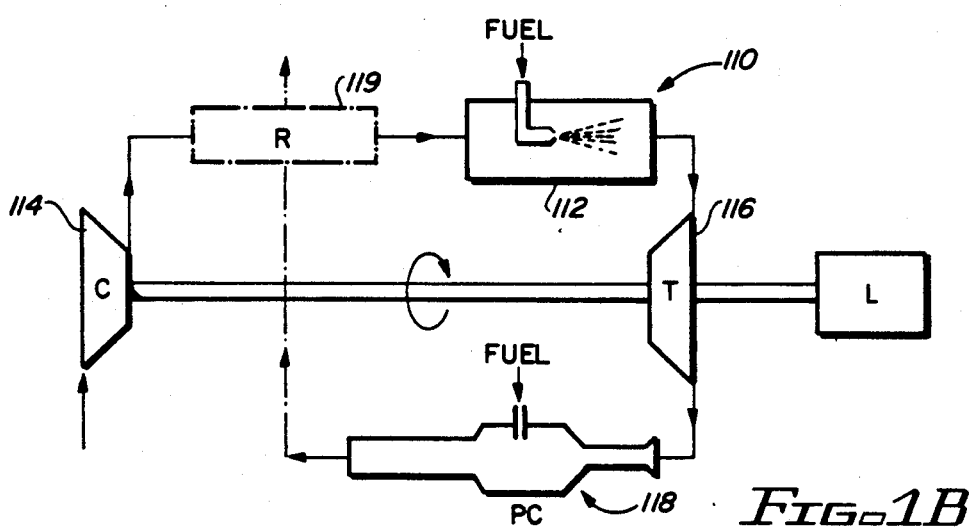
FIG-1B
IDEAL LIMITED
PRESSURE AIR
STANDARD CYCLE
FIG-2A
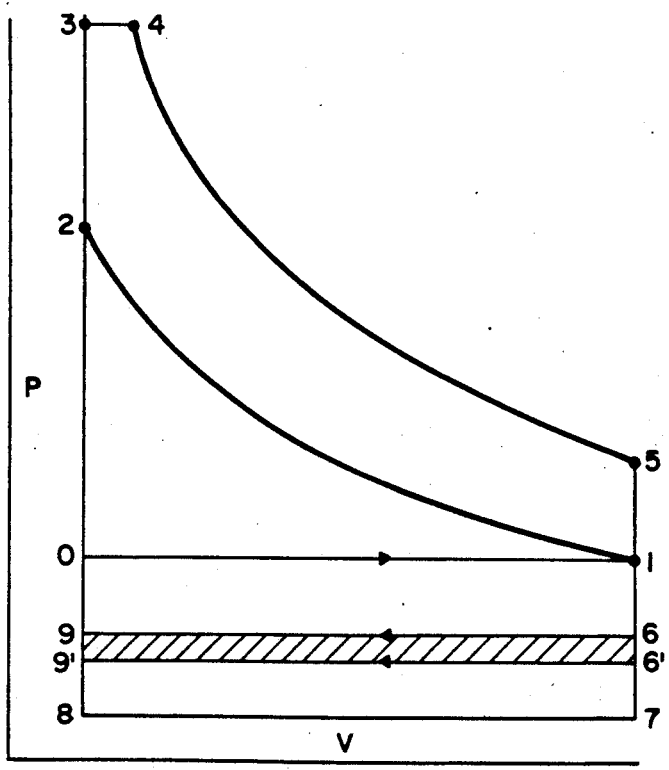

TURBOCHARGER WITH DOWNSTREAM PRESSURE-GAIN COMBUSTOR

BACKGROUND

1. Field of the Invention

This invention relates in general to turbochargers and, more particularly, to a turbocharger having a pressure-gain combustor placed downstream of the turbine.

2. Description of the Prior Art

Turbocharging is a widely accepted method for increasing the power output, torque, and specific power output of an internal combustion engine. One of the key criteria in designing a turbocharged engine is that the characteristics of the turbocharger be properly matched to the compressor and all of the engine components. However, because it is impossible for the operating conditions of the compressor, turbine, and i.c. engine to be identical at all load ratings, most designers match the components at the higher load rating, which inevitably compromises performance at no-load or partial load conditions. This results in the problem known as "turbo lag", wherein the power of the engine is reduced during start-up and other low speed conditions. As a result of increased start-up torque requirements, the problem of turbo lag becomes more severe for higher design point charge pressure.

One solution to turbo lag which has been proposed in the past has been to provide the turbine assembly with multiple vanes which function like adjustable louvers. The adjustable vanes enable an operator to vary the turbine flow area, and hence, the exhaust velocity past the turbine wheel, thus controlling the turbocharger speed and boost level. A major problem with this approach, however, is that the adjustable louvers increase the overall complexity and manufacturing cost of the engine, making it impractical for all but a few applications.

Another solution has been to make the rotor out of lightweight ceramic material, which reduces the rotor's polar moment of inertia. This enables the rotor to accelerate faster, which in turn leads allows the turbocharger to reach its maximum boost level sooner. A drawback ceramic rotors has been their increased fragility, since any particle drawn into the turbocharger exhaust could potentially damage the rotor. Recently, an attempt to reduce this risk has been made by providing the turbine housing with an integral particle trap which removes exhaust particles before they reach the rotor. Once again, however, this approach leads to increased cost and complexity which in many cases outweighs the benefits of improved boost.

Accordingly, a need exists for a new and improved device for boosting the power of a turbocharged engine in a simple and cost-effective manner.

SUMMARY

In accordance with the present invention, a turbocharged engine is provided with a pressure-gain combustor located downstream of the turbine. More specifically, in a conventional turbocharger device comprising a compressor, an internal combustion engine, and a turbine, a pressure-gain combustor is inserted downstream of the turbine. The pressure-gain combustor causes the pressure at the outlet of the turbine to drop, thereby increasing the pressure drop in the internal combustion engine, resulting in increasing power output.

The increase in power output comes with a penalty in thermal efficiency and specific fuel consumption, since additional fuel would be required to operate the combustor. However, in certain applications where short-term additional bursts of power are desired—during start-up, for instance, or in racing or combat situations—the loss in thermal efficiency would be relatively unimportant. In such applications, the pressure-gain combustor would not operate continuously but would instead be activated during transient operations when rapid acceleration is called for.

Another benefit gained by adding a pressure-gain combustor downstream of the turbine is that pressure-gain combustors are known to burn efficiently and to produce low levels of $NO_x$. This reduces the need for catalytic cleaning of the exhaust. In addition, since the unburnt fuels from the engine get a second chance to burn, it alleviates the problem of incomplete combustion in the cylinders during rapid acceleration from low engine speed. This would be especially beneficial for turbocharged diesel engines, which typically emit very high levels of pollutants during acceleration from idle or slow speed. Also, by placing the pressure-gain combustor downstream of the turbine, the latter is not subjected to additional thermal loading of the rotor, which is usually a highly stressed component.

In the preferred embodiment of the invention, the pressure-gain combustor comprises a valveless pulse combustor, also known as an aero-valved combustor. This type of combustor is preferred because its structural simplicity and lack of moving parts makes it inexpensive and easy to install (retrofit) on existing turbocharged engines. However, other types of known pressure-gain combustors, such as detonation-wave combustors and dynamic pressure exchangers or combination thereof, could also be used.

It should also be noted that the principle of the invention need not be limited to turbochargers alone, but that a downstream pressure-gain combustor could also be used in a conventional turbine engine of the type used in stationary power plants, for instance, or in any other application where a temporary increase in the pressure ratio across a turbine may be desired. In addition, the principle may be applied to recuperated as well as unrecuperated engines.

Therefore, it is an object of this invention to provide a turbocharger or turbine engine with means for producing short bursts of power on demand.

Another object of the invention is to provide a turbocharger or turbine engine with a simple, compact, and cost-effective power augmentation device which can be easily retrofitted on existing engines.

Still another object of the invention is to provide a turbocharger or turbine engine with a power augmentation device capable of reduced emission of pollutants.

The foregoing and other objects of the present invention, as well as the invention itself, may be more fully understood from the following description when read in conjunction with the accompanying drawings.

BRIEF DESCRIPTION OF THE DRAWINGS

FIG. 1A is a schematic drawing showing a turbocharged internal combustion engine connected to a load L and having a pressure-gain combustor (PC) downstream of the turbine exhaust.

FIG. 1b is a schematic drawing showing a single spool gas turbine engine driving load L and having a pressure gain combustor downstream of the turbine exhaust. The dotted line indicates the flow path if a recuperator (R) is used.

FIG. 2A is a diagram showing the thermodynamic cycle (P-V diagram) for two turbocharged internal combustion engines. Points 0-1-2-3-4-5-6-9 represent the idealized pressure limited air cycle for a conventional turbocharged internal combustion engine. Points 0-1-2-3-4-5-6'-9' represent the corresponding cycle for a turbocharged internal combustion engine with a downstream pressure-gain combustor. The shaded area represents the increase in work output due to the pressure gain combustor.

DESCRIPTION OF THE PREFERRED EMBODIMENTS

Figure 2B:
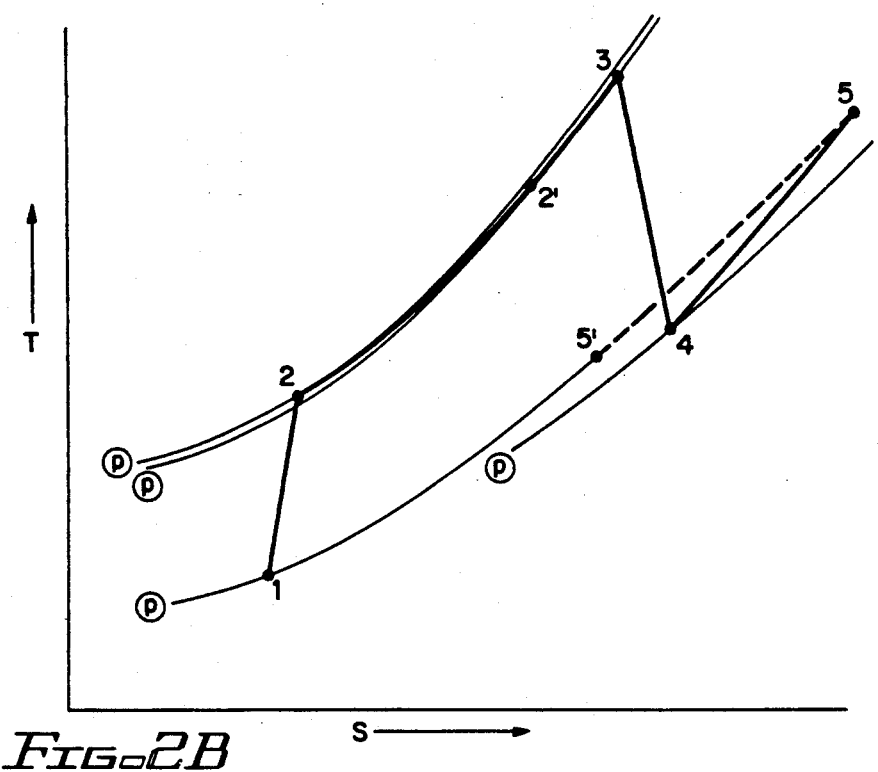
FIG. 2B is a diagram showing the thermodynamic cycle for the turbine power plant of FIG. 1B.

Referring more particularly to the drawings, FIG. 1A is a schematic drawing showing a turbocharger 10 comprising a conventional internal combustion engine 12 with a compressor 14 located upstream of the engine 12 for increasing the inlet A turbine 16, located downstream of the engine 12 and pressure and, hence, the potential power output of the engine 12. mechanically coupled to the compressor 14, is provided for driving the compressor 14. A pressure-gain combustor 18 is located in the exhaust path of the turbine 16.

In a conventional turbocharger, the pressure $P_o$ at the outlet of the turbine would equal atmospheric pressure $P_{at}$. However, in the turbocharger 10 of the instant invention, the presence of the pressure-gain combustor 18 downstream of the turbine would cause the pressure at the outlet of the turbine $P_o$ to drop below atmospheric pressure $P_{at}$ which in turn would cause a correspondingly lower turbine inlet pressure $P_i$. Since the turbine inlet pressure $P_i$ is equal to the outlet pressure of the internal combustion engine 12, this leads to an increase in the indicated mean effective pressure (i.m.e.p.) of the engine.

Figure 3:
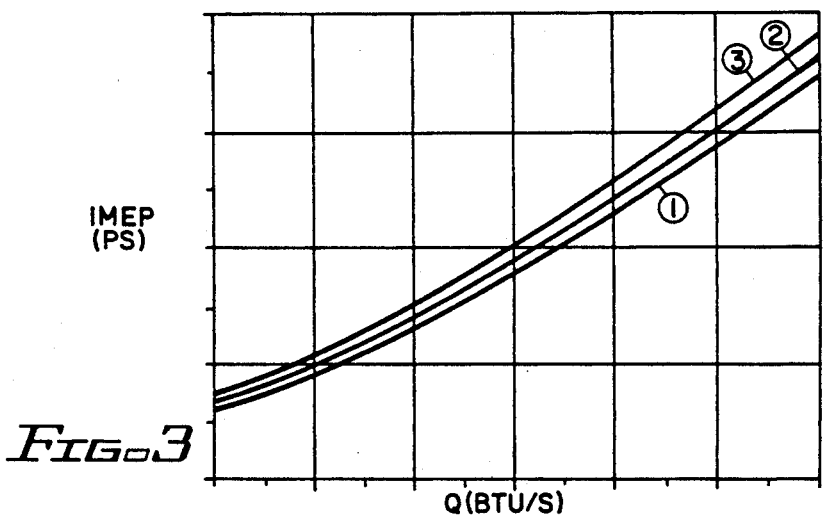
FIG. 3 is a graph showing the steady state indicated mean effective pressure (i.m.e.p.) vs. heat added for a turbocharged engine. Curve 1 shows the results for a turbocharged engine without a downstream pressure-gain combustor. Curve 2 shows the results for a turbocharged engine with a downstream pressure-gain combustor having a 5% pressure gain, and Curve 3 shows the results with a downstream pressure-gain combustor having a 10% pressure gain.

The extent to which i.m.e.p. is increased illustrated graphically in FIG. 3, in which Curve 1 represents i.m.e.p. versus heat added in a constant speed engine for a turbocharger with no downstream pulse combustor, while Curves 2 and 3 represent the same relationship for turbochargers with downstream pulse combustors having pressure gains of 5% and 10%, respectively.

Figure 4:
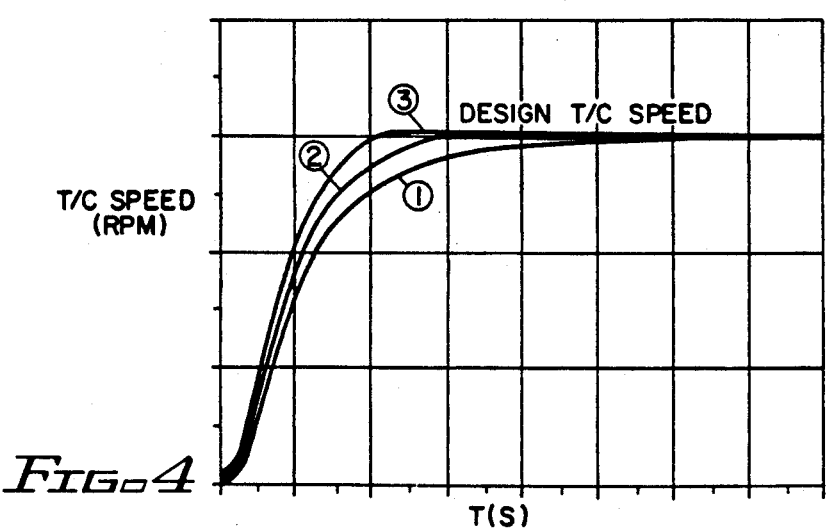
FIG. 4 is a graph comparing the acceleration characteristics for a turbocharged engine without a downstream pressure-gain combustor (Curve 1) to a turbocharged engine with a downstream pressure-gain combustor having a 5% pressure gain (Curve 2), and to a turbocharged engine with a pressure-gain combustor having a 10% pressure gain (Curve 3).

The turborcharger's performance is also improved under transient load conditions such as sudden increase in load, as illustrated graphically in FIG. 4. More specifically, Curve 1 shows the acceleration characteristics of a turbocharger having no downstream pulse combustor, while Curves 2 and 3 show the acceleration characteristics of turbochargers with downstream pulse combustors having pressure gains of 5% and 10% respectively. As the curves demonstrate, the turbocharger having the downstream pulse combustor with the highest pressure gain reaches design speed most quickly.

FIG. 2A compares the thermodynamic cycle for a turbocharger having a downstream pulse combustor to the cycle for a turbocharger without a pulse combustor. More specifically, Points 0-1 on the curve show an increase in the volume of the air which is inducted into the engine cylinder during the engine's constant pressure intake stroke. Points 1-2 show a decrease in volume and rise in pressure during the subsequent compression stroke. Points 2-3 show a rise in pressure as heat is added to the engine at constant volume. Points 3-4-5 represent the expansion stroke of the engine, with segment 3-4 representing the constant pressure portion of the expansion in the idealized limited pressure cycle. Points 5-6 show the drop in pressure through the exhaust valves of a conventional turbocharger (i.e. one without a downstream pulse combustor), while points 5-6' show the pressure drop for a turbocharger having a downstream pulse combustor. Similarly, points 6-9 represent the exhaust stroke in a conventional turbocharger, while points 6'-9' represent the exhaust stroke in a turbocharger having a downstream pulse combustor.

The work done per cycle for the conventional turbocharger is represented by the area enclosed by points 1-2-3-4-5-1 on the curve, plus the area enclosed by points 0-1-6-9-0. For the turbocharger with downstream pulse combustor, the work is represented by the area 1-2-3-4-5-1 plus the area 0-1-6'-9'-0. Thus, the increase in work per cycle because of the pulse combustor is equal to the shaded area 6-6'-9'-9'-6.

The engine's increased power output would come with a penalty in the thermal efficiency and specific fuel consumption of the turbocharger 10, since additional fuel would be required to operate the combustor 18. However, in certain applications where short-term additional bursts of power are desired—during start-up, for instance, or in racing or combat situation—the loss in thermal efficiency would be relatively unimportant. In such applications, the pressure-gain combustor 18 would not operate continuously but would instead be activated during transient operations when rapid acceleration is called for.

Another benefit gained by adding a pressure-gain combustor 18 downstream of the turbine 16 is that pressure-gain combustors are known to burn efficiently and to produce low levels of $NO_x$. This reduces the need for catalytic cleaning of the exhaust. In addition, since the unburnt fuels from the engine 14 get a second chance to burn, it alleviates the problem of incomplete combustion in the cylinders during rapid acceleration from low engine speed. This would be especially beneficial for turbocharged diesel engines, which typically emit very high levels of pollutants during acceleration from idle or slow speed.

In the preferred embodiment of the invention, the pressure-gain combustor 18 is a valveless pulse combustor, also known as an aero-valved pulse combustor. As is generally well known in the art, the main components of a pulse combustor 18 are an inlet pipe 20, combustion chamber 22, and an exhaust pipe or resonance tube 24.

The inlet pipe 20 comprises an aerodynamic valve (not shown) which admits hot air into the combustion chamber 20 when the pressure in the chamber drops below the inlet pressure, and prevents it from flowing back upstream when the pressure in the chamber is above the inlet pressure. Fuel is injected steadily into the combustion chamber 20 via an injector pipe 30, and the fuel/air mixture is initially ignited by means of an igniter (not shown), causing rapid combustion and expansion. The injector pipe 30 is controlled independently of the engine 12, so that the engine may operate with or without it.

The injection of fuel into the combustion chamber 20 results in an outflow of combustion products through the exhaust pipe 24 at high momentum. The outflow of gases eventually drops the pressure in the combustion chamber 20 to drop below inlet pressure, which results in recharging the chamber with combustion air and starting the cycle over. The presence of residual hot and chemically active products in the combustion chamber 20 allows the fresh fuel/air mixture to be reignited without an igniter.

The rapid release of heat during the repeated ignition cycles causes pressure oscillations at a frequency determined by the length and volume of the exhaust pipe 24, the volume of the combustion chamber 20 and the speed of sound. This resonance causes a net stagnation pressure gain from the combustion chamber 20 to the outlet 32. The valveless or aerovalved pulse combustor 18 described above is felt to be preferable over other types of pressure-gain combustors because of its absence of any moving parts. Other devices which may be suitable are denotation wave combustors and dynamic pressure exchangers and combinations thereof. A detonation wave combustor comprises a bifurcated flow passage, one portion of which is a conventional combustor, and the other portion of which is a denotation chamber. A number of igniters are provided in the denotation chamber for initiating a detonation wave which travels transversely through a detonation chamber, thereby causing a combustion driven pressure gain. A dynamic pressure exchanger comprises a continuously rotating cellular rotor running between closely fitted, ported end plates. When a cell runs past a port containing a gas at a higher pressure than that in the cell, a filling process is initiated, and when a cell runs past a port of lower pressure, the cell is emptied. Neither detonation wave combustors nor dynamic pressure exchangers are believed to be fully commercially available at present, but both are in experimental use, and may be adaptable for use in the turbocharger of the present invention at some point in the future.

The principles of the present invention need not be restricted to use in a turbocharger, but may also be used in a conventional turbine engine 110 of the type used in stationary power plants, as shown in FIG. 1B. The components of the turbine engine 110 are essentially the same as those in the turbocharger 10, except that rather than an internal combustion engine 12, a combustor 112, which may be either a conventional steady flow combustor or another pressure-gain combustor, is located between the compressor 114 and the turbine 116. Once again, a pressure-gain combustor 118 is placed in the exhaust path of the turbine 116 in order to increase the pressure ratio across the turbine 116, and therefore boost the overall power output of the engine 110. If desired, a recuperator 119 may be added, enabling a portion of the heat exhausted from the turbine 116 to be recovered and used to raise the temperature of air leaving the compressor 114 before it enters the combustor. The dotted line indicates the flow path if the recuperator 119 is used.

A schematic diagram of the thermodynamic cycle for the turbine engine 110 is shown in FIG. 2B, with the solid line representing the cycle for an unrecuperated engine, and the dotted line representing the cycle for a recuperated engine. More specifically, the segment 1-2 of the curve represents the process in the compressor 114, 2-3 represents the process in the combustor 112, 3-4 represents the process in the turbine 116, and 4-5 represents the process in the pulse combustor 118. The dotted line segments 5-5' and 2-2' represent the process in the recuperator if a recuperator is used.

While the principles of the invention have now been made clear in the illustrated embodiments, there will be immediately obvious to those skilled in the art, many modifications of structure, arrangements, proportions, the elements, materials and components used in the practice of the invention and otherwise, which are particularly adapted for specific environments and operation requirements without departing from those principles.

I claim as my invention:

1. A turbocharger comprising:
   (a) an internal combustion engine;
   (b) a compressor located upstream of said internal combustion engine for increasing the inlet pressure of said internal combustion engine;
   (c) a turbine located downstream of said internal combustion engine and mechanically coupled to said compressor for driving said compressor; and
   (d) a pressure-gain combustor located downstream of said turbine for decreasing the outlet pressure of said internal combustion engine and thus increasing the turbine power output and improving the starting characteristics of said turbocharger.

2. The turbocharger of claim 1, in which said pressure-gain combustor is a pulse combustor.

3. The turbocharger of claim 2, in which said pulse combustor comprises:
   (a) a combustor chamber:
   (b) an inlet pipe including a one-way aerodynamic valve for admitting hot air into said combustion chamber;
   (c) an injector pipe for injecting fuel into said combustion chamber;
   (d) an igniter for initiating ignition of the fuel/air mixture in said combustion chamber; and
   (e) an exhaust pipe for exhausting combustion products from said combustion chamber, said exhaust pipe having a length and volume selected to produce resonance in response to pressure waves produced during combustion.

* * * * *